United States Patent Office 3,842,072
Patented Oct. 15, 1974

3,842,072
CERTAIN 2α-(2-HYDROXYMETHYL - 2 - PROPYL-MERCAPTO) - 3 - AMINO-AZETIDIN - 4 - ONE COMPOUNDS
Karl Heusler, Basel, Switzerland, and Robert Burns Woodward, Cambridge, Mass., assignors to Ciba-Geigy Corporation, Ardsley, N.Y.
No Drawing. Continuation-in-part of abandoned application Ser. No. 843,236, July 18, 1969. This application Mar. 14, 1973, Ser. No. 341,203
Claims priority, application Switzerland, July 23, 1968, 10,998/68; Dec. 11, 1968, 18,510/68
Int. Cl. C07d 25/02
U.S. Cl. 260—239 A                  7 Claims

ABSTRACT OF THE DISCLOSURE

2α-(2 - Hydroxymethyl - 2 - propylmercapto)-3α-N-R-amino-azetidin-4-ones of the formula

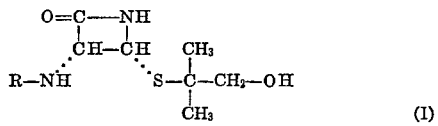

wherein R represents a hydrogen atom or the acyl residue Ac of an organic acid, as well as O-esters of such compounds, are useful as intermediates for the manufacture of valuable compounds.

Cross-Reference to Related Applications

This is a continuation-in-part of application Ser. No. 843,236, filed July 18, 1969, and now abandoned.

Summary of the Invention

The subject of the present invention are carbinolalkyl-mercapto compounds, especially 2α-(2-hydroxymethyl-2-propylmercapto)-3α-N-R-amino-azetidin - 4 - ones of the formula

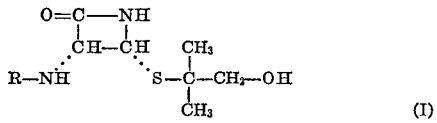

wherein R represents a hydrogen atom or the acyl residue Ac of an organic acid, as well as O-esters of such compounds, as well as process for the invention. The above compounds are primarily useful as intermediates for the manufacture of pharmacologically active compounds having the 7-amino-cephalosporanic acid portion.

Preferred Embodiments of the Invention

A group Ac primarily represents the acyl radical of an organic carboxylic acid, especially the acyl radical of an optionally substituted aliphatic, cycloaliphatic, cycloaliphatic-aliphatic, aromatic, araliphatic, heterocyclic or heterocyclic-aliphatic carboxylic acid, as well as the acyl radical of a carbonic acid semi-derivative.

The aliphatic radical of an aliphatic carboxylic acid, which term also includes formic acid, is an optionally substituted aliphatic hydrocarbon radical, such as an alkyl, alkenyl or alkinyl radical, especially a lower alkyl or lower alkenyl radical, as well as also a lower alkynyl radical, which can, for example, contain up to 7, preferably up to 4, carbon atoms. Such radicals can optionally be monosubstituted, disubstituted or polysubstituted by functional groups, for example, by free, etherified or esterified hydroxyl or mercapto groups, such as lower alkoxy, lower alkenyloxy, lower alkylenedioxy, optionally substituted phenyloxy or phenyl-lower alkoxy, lower alkylmercapto or optionally substituted phenylmercapto or phenyl-lower alkylmercapto, lower alkoxycarbonyloxy or lower alkanoyloxy groups, as well as halogen atoms, and furthermore by nitro groups, optionally substituted amino groups, acyl, such as lower alkanoyl groups, or optionally functionally modified carboxyl groups, such as carbo-lower alkoxy, optionally N-substituted carbamoyl or cyano groups.

A cycloaliphatic or cycloaliphatic-aliphatic radical of a corresponding carboxylic acid is an optionally substituted cycloaliphatic or cycloaliphatic-aliphatic hydrocarbon radical, for example, a monocyclic, bicyclic or polycyclic cycloalkyl or cycloalkenyl group or cycloalkyl- or cyclo-alkenyl-lower alkyl or -lower alkenyl group, wherein a cycloalkyl radical, for example, contains up to 12, such as 3–8, preferably 3–6, ring carbon atoms, whilst a cycloalkenyl radical can, for example, contain up to 12, such as 3–8, especially 5–8, preferably 5 or 6, ring carbon atoms, as well as 1 to 2 double bonds and the aliphatic part of a cycloaliphatic-aliphatic radical can, for example, contain up to 7, preferably up to 4, carbon atoms. The above cycloaliphatic or cycloaliphatic-aliphatic radicals can, if desired, be monosubstituted, disubstituted or polysubstituted, for example, by optionally substituted aliphatic hydrocarbon radicals, such as, for example, the optionally substituted lower alkyl groups mentioned above, or, for example, like the abovementioned aliphatic hydrocarbon radicals, by functional groups.

The aromatic radical of a corresponding carboxylic acid is an optionally substituted aromatic hydrocarbon radical, for example, a monocyclic, bicyclic or polycyclic aromatic hydrocarbon radical, especially a phenyl radical, as well as a biphenylyl or naphthyl radical, which can optionally be monosubstituted, disubstituted or polysubstituted, for example, like the abovementioned aliphatic and cycloaliphatic hydrocarbon radical.

The araliphatic radical in an araliphatic carboxylic acid is, for example, an optionally substituted araliphatic hydrocarbon radical, such as an optionally substituted aliphatic hydrocarbon radical which, for example, possesses up to 3 optionally substituted monocyclic, bicyclic or polycyclic aromatic hydrocarbon radicals, and primarily represents a phenyl-lower alkyl or phenyl-lower alkenyl, as well as phenyl-lower alkynyl radical, such radicals containing, for example, 1–3 phenyl groups and optionally being monosubstituted, disubstituted or polysubstituted in the aromatic and/or aliphatic portion, for example, like the abovementioned aliphatic and cycloaliphatic radicals.

Heterocyclic radicals in heterocyclic or heterocyclic-aliphatic carboxylic acids are especially monocyclic, as well as bicyclic or polycyclic, azacyclic, thiacyclic, oxacyclic, thiazacyclic, oxazacyclic or diazacyclic radicals of aromatic character which can optionally be monosubstituted, disubstituted or polysubstituted, for example, like the abovementioned cycloaliphatic radicals. The aliphatic portion in heterocyclic-aliphatic radicals has, for example, the significance given for the corresponding cycloaliphatic-aliphatic or araliphatic radicals.

The acyl radical of a carbonic acid semi-derivative is preferably the acyl radical of a corresponding half-ester, wherein the esterifying organic radical represents an optionally substituted aliphatic, cycloaliphatic, aromatic or araliphatic hydrocarbon radical or a heterocyclic-aliphatic radical, primarily the acyl radical of a lower alkyl half-ester of carbonic acid which is optionally substituted, preferably in the α-position, as well as in the β-position (that is to say a carbo-lower alkoxy radical which is optionally substituted in the lower alkyl portion, preferably in the α-, as as well as in the β-position), as well as a lower alkenyl, cycloalkyl, phenyl or phenyl-lower alkyl half-ester of carbonic acid which is optionally substituted in the lower alkenyl, cycloalkyl, phenyl or phenyl-lower alkyl portion, respectively (that is to say a carbo-lower alkenyloxy, carbo-cycloalkoxy, carbo-phenyloxy or carbo-phenyl-lower alkoxy radical which is optionally substituted in the lower alkenyl, cycloalkyl, phenyl or phenyl-lower alkyl portion, respectively). Acyl radicals of a carbonic acid half-ester are furthermore corresponding radicals of lower alkyl half-esters of carbonic acid, in which the lower alkyl portion contains a heterocyclic group, for example, one of the abovementioned heterocyclic groups of aromatic character, the lower alkyl radical and the heterocyclic group being optionally substituted. Such acyl radicals are carbo-lower alkoxy groups which are optionally substituted in the lower alkyl portion and which contain an optionally substituted heterocyclic group of aromatic character in the lower alkyl radical.

A lower alkyl radical is, for example, a methyl, ethyl, n-propyl, isopropyl, n-butyl, isobutyl, sec.-butyl or tert.-butyl, as well as n-pentyl, isopentyl, n-hexyl, isohexyl or n-heptyl group, while a lower alkenyl radical can, for example, be a vinyl, allyl, isopropenyl, 2- or 3-methallyl or 3-butenyl group, and a lower alkynyl radical, for example, a propargyl or 2-butynyl group.

A cycloalkyl group is, for example, a cyclopropyl, cyclobutyl, cyclopentyl, cyclohexyl or cycloheptyl, as well as adamantyl group, and a cycloalkenyl group is, for example, a 2- or 3-cyclopentenyl, 1-, 2- or 3-cyclohexenyl or 3-cycloheptenyl, as well as a 2-cyclopropenyl group. A cycloalkyl-lower alkyl or -lower alkenyl radical is, for example, a cyclopropyl-, cyclopentyl-, cyclohexyl- or cycloheptyl-methyl, -1,1-ethyl or -1,2-ethyl, -1,1-propyl, -1,2-propyl or -1,3-propyl, -vinyl or -allyl group, while a cycloalkenyl-lower alkyl or -lower alkenyl group represents, for example, a 1-, 2- or 3-cyclopentenyl-, 1-, 2- or 3-cyclohexenyl- or 1-, 2- or 3-cycloheptenyl-methyl, -1,1-ethyl or -1,2-ethyl, -1,1-propyl, -1,2-propyl or -1,3-propyl, -vinyl or -allyl group.

A naphthyl radical is a 1- or 2-naphthyl radical, while a biphenylyl group represents, for example, a 4-biphenylyl radical.

A phenyl-lower alkyl or phenyl-lower alkenyl radical is, for example, a benzyl, 1- or 2-phenylethyl, 1-, 2- or 3-phenylpropyl, diphenylmethyl, trityl, 1- or 2-naphthyl-methyl, styryl or cinnamyl radical.

Heterocyclic radicals are, for example, monocyclic, monoazacyclic, monothiacyclic or monooxacyclic radicals of aromatic character, such as pyridyl, for example, 2-pyridyl, 3-pyridyl or 4-pyridyl radicals, thienyl, for example, 2-thienyl radicals, or furyl, for example, 2-furyl radicals, or bicyclic monoazacyclic radicals of aromatic character, such as quinolinyl, for example, 2-quinolinyl or 4-quinolinyl radicals, or isoquinolinyl, for example, 1-isoquinolinyl radicals, or monocyclic thiazacyclic or oxazacyclic as well as diazacyclic radicals of aromatic character, such as oxazolyl, isoxazolyl, thiazolyl or isothiazolyl, as well as pyrimidinyl radicals. Heterocyclic-aliphatic radicals are lower alkyl or lower alkenyl radicals containing heterocyclic radicals, especially those mentioned above.

By esterified hydroxyl groups there are primarily to be understood lower alkoxy, for example, methoxy, ethoxy, n-propyloxy, isopropyloxy, n-butyloxy, isobutyloxy, sec.-butyloxy, tert.-butyloxy, n-pentyloxy or tert.-pentyloxy groups, as well as substituted lower alkoxy, such as halogeno-lower alkoxy, especially 2-halogeno-lower alkoxy, for example, 2,2,2-trichloroethoxy or 2-iodoethoxy groups, furthermore lower alkenyloxy, for example, vinyloxy or allyloxy groups, lower alkylenedioxy, for example, methylenedioxy or ethylenedioxy, as well as isopropylidenedioxy groups, cycloalkoxy, for example, cyclopentyloxy, cyclohexyloxy or adamantyloxy groups, phenyloxy groups, phenyl-lower alkoxy, for example, benzyloxy or 1- or 2-phenylethoxy groups, or lower alkoxy groups substituted by monocyclic monoazacyclic, monooxacyclic or monothiacyclic groups of aromatic character, such as pyridyl-lower alkoxy, for example, 2-pyridylmethoxy groups, furyl-lower alkoxy, for example, furfuryloxy groups, or thienyl-lower alkoxy, for example, 2-thienyloxy groups.

As etherified mercapto groups, lower alkylmercapto, for example, methylmercapto or ethylmercapto groups, phenylmercapto groups, or phenyl-lower alkylmercapto, for example, benzylmercapto groups may be mentioned.

Esterified hydroxyl groups are primarily halogen, for example, fluorine, chlorine, bromine or iodine atoms, as well as lower alkanoyloxy, for example, acetyloxy or propionyloxy groups.

Substituted amino groups are monosubstituted or disubstituted amino groups, in which the substituents primarily represent optionally substituted mono- or divalent aliphatic, cycloaliphatic, cycloaliphatic-aliphatic, aromatic or araliphatic hydrocarbon radicals, as well as acyl groups. Such amino groups are especially lower alkylamino or dilower alkylamino groups, for example, methylamino, ethylamino, dimethylamino or diethylamino groups, or lower alkyleneamino groups, which are optionally interrupted by hetero-atoms, such as oxygen or sulfur atoms or nitrogen atoms which are optionally substituted, for example, by lower alkyl groups, such as pyrrolidino, piperidino, morpholino, thiomorpholino or 4-methyl-piperazino groups, as well as acylamino groups, especially lower alkanoylamino groups, such as acetylamino or propionylamino groups.

Lower alkanoyl is e.g., acetyl or propionyl.

A carbo-lower alkoxy radical is, for example, a carbomethoxy, carboethoxy, carbo-n-propyloxy- carbo-isopropyloxy, carbo-tert.-butyloxy or carbo-tert.-pentyloxy group.

Optionally N-substituted carbamoyl groups are, for example, N-lower alkyl-carbamoyl or N,N-di-lower alkyl-carbamoyl groups, such as N-methyl-, N-ethyl-, N,N-dimethyl- or N,N-diethyl-carbamoyl groups.

A carbo-lower alkenyl radical is, for example, the carbo-vinyloxy group, while carbo-cycloalkoxy and carbo-phenyl-lower alkoxy groups, in which the cycloalkyl or phenyl-lower alkyl radical have the abovementioned significance, represent, for example, carbo-adamantyloxy, carbo-benzyloxy or carbo-diphenylmethoxy, as well as carbo-(α-4-biphenylyl-α-methyl-ethoxy) groups. Carbo-lower alkoxy groups in which the lower alkyl residue contains, for example, a monocyclic, monoazacyclic, monooxacyclic or monothiacyclic group are, for example, carbo-furyl-lower alkoxy, such as carbo-furfuryloxy groups, or carbo-thienyl-lower alkoxy, for example, carbo-2-thenyloxy groups.

O-Esters of compounds of formula I are those with inorganic acids, such as mineral acids, for example, hydrohalic acids, such as hydrochloric or hydrobromic acid, sulfuric acid or phosphoric acid, primarily with organic acids, for example, organic sulfonic acids, especially aliphatic or aromatic sulphonic acids, in which aliphatic and aromatic residues have the above-mentioned significance, such as lower alkanesulfonic acids, for example, methanesulfonic or ethanesulfonic acid, or arylsulfonic acids, for example, benzenesulfonic or toluenesulfonic acid, and especially esters with organic carboxylic acids, such as aliphatic, cycloaliphatic, cycloaliphatic-aliphatic, aromatic, araliphatic, heterocyclic or heterocyclic-aliphatic carboxylic acids which contain, for example, the above-mentioned organic residues, such as lower alkanecarboxylic acids, optionally substituted, for example, by halogen atoms, such as formic, propionic, pivalic, diethylacetic or chloroacetic, cycloalkanecarboxylic, such as cyclopentanecarboxylic or cyclohexanecarboxylic acid, cycloalkyl-lower alkanecarboxylic, such as cyclohexylacetic acid, aromatic and araliphatic carboxylic acids optionally substituted in the aromatic ring, for example, by lower alkyl, lower alkoxy, nitro, carboxyl, carbo-lower alkoxy, carbamoyl or cyano groups or halogen atoms, for example, benzoic, naphthoic, phenylacetic, phenylpropionic or cinnamic acid, or carboxylic acids containing optionally substituted heterocyclic residues, for example, pyridinecarboxylic, furanecarboxylic or thiophenecarboxylic acids, 2-pyridyl-acetic or 2-thiopheneacetic acid, as well as 3-(2-furyl)-propionic acid.

The compounds of the present invention may be present in the form of mixtures of isomers or as pure isomers.

The compounds according to the invention of formula I represent valuable intermediates. Compounds to be particularly emphasized are those of the formula

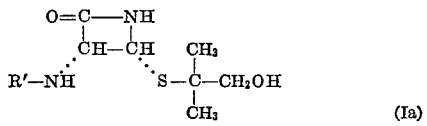

(Ia)

wherein R' denotes a hydrogen atom or the acyl residue Ac', the latter representing an acyl residue occurring in pharmacologically active N-acyl derivatives of 6-aminopenicillanic acid or 7-amino-cephalosporanic acid, such as, for example, the radical of the formula $$Y-(C_mH_{2m})-CO-,$$

wherein $m$ represents an integer from 0 to 4, preferably 1, and a carbon atom of a preferably unbranched alkylene radical of formula $-(C_mH_{2m})-$ can optionally be substituted by an optionally substituted amino group, a free, etherified or esterified hydroxyl or mercapto group or a free or functionally modified carboxyl group, for example, by one of the abovementioned groups of this kind, and wherein Y stands for an aromatic or cycloaliphatic hydrocarbon radical or heterocyclic radical, the latter preferably of aromatic character, optionally substituted in the nucleus, for example, by the substituents of the above alkylene radical, as well as by sulfo or nitro groups, or for a hydroxyl or mercapto group which is etherified by an aromatic or cycloaliphatic hydrocarbon radical or by a heterocyclic radical, the latter preferably of aromatic character, for example, a 2,6-dimethoxybenzoyl, tetrahydronaphthoyl, 2-methoxy-naphthoyl, 2-ethoxy-naphthoyl, phenylacetyl, phenyloxyacetyl, phenylthioacetyl, bromophenylthioacetyl, 2-phenyloxypropionyl, α-phenyloxyphenylacetyl, α-methoxy-phenylacetyl, α-methoxy-3,4-dichlorophenylacetyl, α-cyano-phenylacetyl, phenylglycyl (optionally having a protected amino group), benzyloxycarbonyl, benzylthioacetyl, benzylthiopropionyl, hexahydrobenzyloxycarbonyl, cyclopentanoyl, α-amino-cyclopentanoyl or α-amino-cyclohexanoyl (optionally having a protected amino group), 2-thienylacetyl, α-cyano-2-thienylacetyl, α-amino-2-thienylacetyl (optionally having a protected amino group), 3-thienylacetyl, 2-furylacetyl, 2-phenyl-5-methyl-isoxazolyl-carbonyl or 2-(2-chlorophenyl)-5-methyl-isoxazolylcarbonyl group, or represents a radical of one of the formulae $C_nH_{2n+1}CO-$ and $C_nH_{2n-1}CO-$, wherein $n$ represents an integer up to 7, and the chain can be straight or branched and optionally interrupted by an oxygen or sulfur atom and/or substituted, for example, by halogen atoms, trifluoromethyl, free or functionally modified carboxyl, such as cayno, free or substituted amino or nitro groups, for example, a propionyl, butyryl, hexanoyl, octanoyl, butylthio-acetyl, acrylyl, crotonyl, 2-pentenoyl, allylthio-acetyl, chloroacetyl, 3-chloropropionyl, 3-bromopropionyl, aminoacetyl, 2-carboxypropionyl, cyanoacetyl or 2-cyano-3-dimethyl-acrylyl group, or represents a radical of the formula Z—NH—CO—, wherein Z denotes an aromatic or aliphatic hydrocarbon radical which is optionally substituted, especially a lower alkyl radical substituted by lower alkoxy groups and/or halogen atoms, and primarily a monocyclic arylacetyl or aryloxyacetyl or a lower alkanoyl or alkenoyl radical, e.g. 4-hydroxy-phenylacetyl, hexanoyl, heptanoyl or 2 - hexenoyl radical, and in the first place phenylacetyl or phenyloxyacetyl, or represents an easily removable acyl radical, especially the radical of a half-ester of carbonic acid, in the first place carbo-lower alkoxy, for example, carbo-tert.-butyloxy or carbo-tert.-pentyloxy radical, as well as a carbo-cycloalkoxy, for example, carbo-adamantyloxy radical, a carbo-phenyl-lower alkoxy, for example, carbo-diphenylmethoxy radical, or a carbo-furyl-lower alkoxy, for example carbo-furfuryloxy radical, and O-esters of compounds of the formula Ia having as esterifying radical a lower alkanoyl group, primarily acetyl, a lower alkoxycarbonyl group, primarily methoxycarbonyl or ethoxycarbonyl, or a 2-halogeno-loweralkoxycarbonyl group, primarily 2,2,2-trichloroethoxycarbonyl.

The compounds of formula I can be obtained by treating a 2-hydroxy - 3,3 - dimethyl-6-N-Ac-amino-4-thia-1-azabicyclo[3,2,0]-heptan-7-one compound of formula

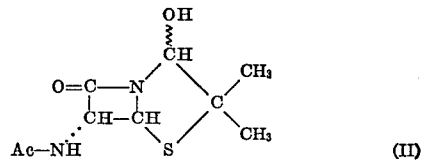

(II)

with a hydride reducing agent which is inert towards amide groupings, and, if desired, in a resulting compound esterifying the free hydroxyl group, and/or, if desired, in a resulting compound having an acyl residue possessing protected functional groups liberating these groups, and/or, if desired, in a resulting compound splitting an acylamino grouping and, if desired, acylating a free amino group, and/or, if desired resolving a resulting isomer mixture into the individual isomers.

Hydride reducing agents which do not reduce an amide grouping are primarily hydrides containing boron, such as, for example, diborane and primarily alkali metal or alkaline earth metal borohydrides, especially sodium borohydride. Complex organic aluminium hydrides, such as alkali metal tri-lower alkoxy-aluminium hydrides, for example, lithium tri-tert.-butyloxy-aluminium hydride, can also be used.

These reducing agents are preferably used in the presence of suitable solvents or mixtures thereof, alkali metal borohydrides, for example, in the presence of solvents with hydroxyl or ether groupings, such as lower alkanols, for example, methanol or ethanol, as well as isopropanol, and also tetrahydrofuran or diethylene glycol dimethyl ether, if necessary, while cooling or warming.

If desired, the hydroxyl group in a resulting compound can be esterified in a manner which is in itself known. The usual acylating agents such as acids or their reactive derivatives are used for this purpose, the former, for example, in the presence of a suitable condensation agent, such as a carbodiimide, for example, dicyclohexylcarbodiimide, and the latter, if necessary, in the presence of a basic reagent, such as an organic tertiary base, for example, triethylamine or pyridine. Reactive derivatives of acids are anhydrides, including internal anhydrides, such as ketenes, isocyanates or isothiocyanates, or mixed anhydrides, especially anhydrides obtained with halogenoformic acid esters, for example, chloroformic acid ethyl ester, and furthermore halides, primarily chlorides, or reactive esters, such as esters of acids with alcohols or phenols containing electron-attracting groupings, as well as with N-hydroxy compounds, for example, cyanomethanol, p-nitrophenol or N-hydroxysuccinimide. The acylation reaction can be performed in the presence or absence of solvents or solvent mixtures, if necessary, with cooling or warming, in a closed vessel under pressure and/or in an inert gas atmosphere, for example nitrogen atmosphere.

The conversion of the free hydroxyl group into a hydroxyl group esterified by an inorganic acid, especially a hydrogen halide acid, can be performed in a manner which is in itself known, for example, by treatment with the usual halogenating agents, such as halides of sulfur and of phosphorus, for example, thionyl chloride and phosphorus oxychloride.

In a resulting compound, a suitable acyl residue Ac, particularly the acyl residue of a carbonic acid half-ester, such as, for example, a carbo-lower alkoxy residue which can be split under acid conditions or by reduction, such as the carbo-tert.-butyloxy, as well as carbo-tert.-pentyloxy, carbo-adamantyloxy or carbo-diphenylmethoxy residue, or the carbo-2,2,2-trichloroethoxy residue, can be split off, the latter, for example, by treatment with chemical reducing agents such as the reducing agents mentioned below, especially with metals, metal alloys or metal amalgams, preferably in the presence of hydrogen-furnishing reagents, such as zinc in the presence of aqueous acetic acid, as well as strongly reducing metal salts, and the former, for example, by treatment with trifluoroacetic acid. In a similar manner, protected functional groups in the acyl residue can be converted to the corresponding free groups.

In a resulting compound with a free amino group, the latter can be acylated in the usual manner by treatment with a free or functionally modified carboxylic acid, for example, with an acid chloride or acid anhydride, such as, for example, the reagents used for O-acylation.

The starting materials can, for example, be obtained by reacting a 2-isocyanato-3,3-dimethyl-6-N-Ac$_0$-amino-4-thia-1-azabicyclo[3,2,0]heptan - 7 - one (configuration of 6-amino-penicillanic acid) for formula

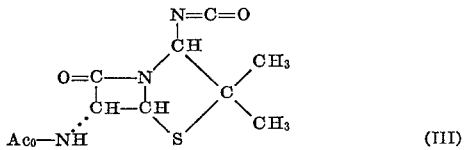

(III)

wherein Ac$_0$ has the significance of an acyl residue Ac, in which free functional groups optionally present are protected, with a 2-halogeno-lower alkanol of formula R$_0$—OH, where R$_0$ represents a 2-halogeno-lower alkyl residue, in which halogen has an atomic weight of above 19, and, if desired in a resulting compound having an acyl residue with protected functional groups, liberating these groups, and/or, in a resulting compound splitting an acylamino grouping, and acylating the liberated amino group, and treating the resulting compound of formula

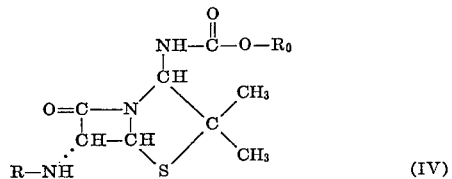

(IV)

(configuration of 6-amino-penicillanic acid) with a chemical reducing agent in the presence of water, and, if desired, in a resulting compound having an acyl residue with protected functional groups converting these groups into free functional groups, and/or, if desired, resolving a resulting isomer mixture into the individual isomers.

In the above intermediate product free functional groups in the acyl radical Ac$_0$, which have to be protected during the reaction, for example, in a manner which is in itself known, are primarily free hydroxyl, mercapto and amino groups as well as carboxyl groups. The latter can, for example, be protected by conversion into an ester, for example, an ester which is easily split under acid conditions, such as a methyl ester which is polysubstituted by optionally substituted aliphatic or aromatic hydrocarbon radicals, such as the tert.-butyl ester, or an ester which is easily split by reduction, such as a 2-halogeno-lower alkyl ester, especially the 2,2,2-trichloroethyl ester, whereas the former can, for example, be protected by conversion into an easily splitable acyl derivative, such as a carbo-lower alkoxy derivative, which can be split under acid conditions, e.g. one in which the lower alkyl radical in the α-position is preferably branched or substituted by optionally substituted aromatic hydrocarbon radicals, for example, the carbo-tert.-butyloxy derivative, or into a carbo-2-halogeno-lower alkoxy derivative, which is easily split by reduction, such as a carbo-2,2,2-trichloroethoxy derivative.

The 2-halogeno-lower alkyl radical R$_0$ in the starting material may contain one, two or more halogen, i.e. chlorine, bromine or iodine atoms, with 2-chloro- and 2-bromo-lower alkyl radicals containing several, preferably three chlorine and bromine atoms, respectively, whereas a 2-iodo-lower alkyl radical may have only one iodine atom. The radical R$_0$ especially represents a 2-polychloro-lower alkyl, such as a 2-polychloroethyl, primarily the 2,2,2-trichloroethyl, as well as the 2,2,2-trichloro-1-methyl-ethyl radical, but can also, for example, denote a 2-polybromo-lower alkyl, such as 2,2,2-tribromoethyl, or a 2-iodo-lower alkyl radical, for example, the 2-iodoethyl radical.

The reaction with a suitable 2-halogeno-lower alkanol, especially a 2-halogenoethanol, for example, 2,2,2-trichloroethanol, is optionally carried out in an inert solvent, for example, in a halogenated hydrocarbon, such as carbon tetrachloride, chloroform or methylene chloride or in an aromatic solvent, such as benzene, toluene or chlorobenzene, preferably with warming.

In this reaction it is possible to start from precursors of compounds of the formula III, form the latter under the reaction conditions and thus to obtain the desired starting materials directly. If, for example, an appropriate 3,3-dimethyl-6-N-Ac$_0$-amino-7-oxo-4 - thia - 1 - aza - 2 - bicyclo[3.2.0]heptane-carboxylic acid azide (configuration of 6-amino-penicillanic acid), which can, for example, be obtained by converting a 3,3-dimethyl-6-N-Ac$_0$-amino-7-oxo-4-thia-1-aza-2 - bicyclo[3.2.0]heptane - carboxylic acid (configuration of 6-amino-penicillanic acid), for example, a 6-N-Ac$_0$-amino-penicillanic acid, or a suitable salt, especially an ammonium salt thereof, into a mixed anhydride (for example, by treatment with a halogenoformic acid lower alkyl ester, such as chloroformic acid ethyl ester, in the presence of a basic reagent, such as triethylamine) and treating the latter with a metal azide, such as sodium azide, or an ammonium azide, for example, benzyltrimethylammonium azide, is used, this azide, in the absence or presence of the 2-halogeno-lower alkanol, decomposes with the evolution of nitrogen under the reaction conditions, for example, on warming, to give the desired isocyanato compound of the formula III, which usually does not have to be isolated and which in the presence of the 2-halogeno-lower alkanol is directly converted to the desired starting material.

In a compound resulting from the above procedure the chlorine or bromine atom in a 2-monochloro- and 2-monobromo-lower alkyl radical, respectively, may be exchanged for an iodine atom, for example, by treatment with a suitable iodine salt, such as an alkali metal iodide, e.g. potassium iodide, in the presence of a suitable solvent, e.g. acetone.

In an intermediate obtainable in accordance with the above process an acyl radical, especially the acyl radical of a suitable half-ester of carbonic acid, such as a carbo-lower alkoxy radical which can be split under acid conditions, for example, the carbo-tert.-butyloxy, as well as carbo-tert.-pentyloxy, carbo-adamantyloxy or carbodiphenyl-methoxy radical, for example, by treatment with trifluoracetic acid. In a similar manner, protected functional groups in an acyl radical in a resulting starting material can be converted to the corresponding free groups.

In an intermediate material with a free amino group the latter can be acylated according to methods which are in themselves known, for example, like a free hydroxyl group in the manner described above, i.e. by treatment with a free carboxylic acid or especially a reactive functionally modified carboxylic acid, for example, with an acid chloride or acid anhydride, optionally in the presence of a condensing reagent.

The treatment of the starting material with the chemical reducing agent is carried out under mild conditions, in most cases at room temperature or even with cooling. At least one mole usually an excess of water is present.

Chemical reducing agents are primarily suitable reducing metals, as well as reducing metal compounds, e.g. metal alloys or metal amalgams, as well as strongly reducing metal salts. Particularly useful are zinc, zinc alloys, e.g. zinc-copper or zinc amalgam, furthermore magnesium, which reagents are advantageously used in the presence of hydrogen-furnishing compounds capable of producing nascent hydrogen together with the metals, metal alloys and metal amalgams, zinc, for example, in the presence of acids, such as organic carboxylic, e.g. lower alkane carboxylic acids, above all acetic acid, with the addition of water, as well as in the presence of aqueous alcohols, such as lower alkanols, e.g. methanol, ethanol or isopropanol, which may be used together with an organic carboxylic acid, and alkali metal amalgams, such as sodium or potassium amalgam, as well as aluminum amalgam in the presence of moist solvents, such as ethers or lower alkanols. Strongly reducing metal salts are primarily chromium-II compounds, for example, chromium-II-chloride or chromium-II-acetate, which are used in the presence of aqueous media, containing organic solvents miscible with water, such as lower alkanols, lower alkanecarboxylic acids or ethers, for example, methanol, ethanol, acetic acid, tetrahydrofuran, dioxane, ethylene glycol dimethyl ether or diethylene glycol dimethyl glycol dimethyl ether.

In a resulting starting material, protected functional groups in an acyl residue may be liberated in a manner which is in itself known, for example, as described above.

As has been mentioned, the resulting compounds of formula I are valuable intermediate products. Thus, they can *inter alia* be employed for the manufacture of compounds of the formula

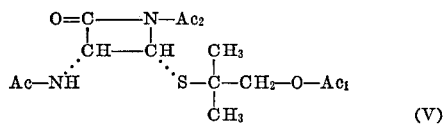

(V)

in which each of the groups $Ac_1$ and $Ac_2$ denotes the residue of an organic carboxylic acid, especially of compounds of the formula

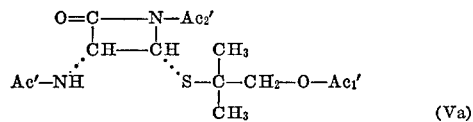

(Va)

wherein each of the residues $Ac_1'$ and $Ac_2'$ represents a lower alkanoyl residue. These compounds are active against gram-positive bacteria, especially against *Staphylococcus aureus*, and are, therefore, useful as antibacterially active compounds.

They are obtained, when compounds of the formula I, in which R represents the acyl residue Ac, in which free functional groups optionally present may be protected, or O-esters thereof are acylated with carboxylic acids at elevated temperature. Organic carboxylic acids, but primarily their reactive functional derivatives, such as those described above, especially anhydrides or halides, such as chlorides, are used as acylating agents and the process is preferably carried out at temperatures of about 40° C. to about 150° C., especially within a temperature range of about 60° C. to about 120° C., and, if necessary, in the presence of a condensing reagent suitable for acylation purposes, a free carboxylic acid, for example, in the presence of a carbodiimide, such as dicyclohexylcarbodiimide, and a reactive functional derivative of an organic carboxylic acid in the presence of an organic base, especially a tertiary base, such as pyridine.

Furthermore, compounds of the formula I, in which R represents an acyl residue $Ac_0$, and their O-esters, especially those with organic carboxylic acids, as well as carbonic acid semi-derivatives, can be converted to compounds of formula

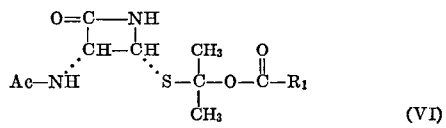

(VI)

by treatment with an oxidizing reagent furnishing an acyloxy group of the formula $-O-C(=O)-R_1$, if desired, after liberating protected functional groups in a resulting compound with an acyl residue having protected functional groups.

Compounds of the formula VI, especially those of the formula

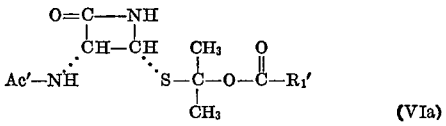

(VIa)

exhibit an activity against micro-organisms, especially gram-positive bacteria, such as *Staphylococcus aureus*, and are, therefore, used accordingly. They are also useful as intermediate compounds.

As oxidizing agents furnishing acyloxy groups of the formula $-O-C(=O)-R_1$ are preferably oxidizing heavy metal carboxylates, preferably lead-IV-carboxylates, such as lead-IV-alkylcarboxylates, especially lead-IV-lower alkylcarboxylates and primarily lead-tetraacetate, also lead tetrapropionate or lead tetrastearate, as well as optionally substituted lead tetrabenzoates, for example, lead tetrabenzoate or lead tetra-3-bromobenzoate, also thallium-III-carboxylates, for example, thallium-III-acetate, or mercury-II-carboxylates, such as mercury-II-acetate. If desired, these oxidizing agents can be formed *in situ*, for example, by reacting lead dioxide or mercury-II-oxide with an organic carboxylic acid, such as acetic acid. At least an equivalent amount of the oxidizing reagent is used; normally an excess thereof is employed.

The above heavy metal carboxylates, especially the corresponding lead-IV compounds, are advantageously used in the presence of a source of light, the process preferably being carried out under ultra-violet light, as well as light of longer wavelengths, such as visible light, optionally with the addition of suitable sensitisers. Ultra-violet light has preferably a main wavelength range of above 280 mµ, primarily of about 300 mµ to about 350 mµ; this can, for example, be achieved by suitably filtering the ultra-violet light through an appropriate filter, for example, a glass filter, or through suitable solutions, such as salt solutions, or other liquids which absorb light of shorter wavelengths, such as benzene or toluene. The ultraviolet light is preferably generated by means of a high pressure mercury vapour lamp.

The above reaction can, for example, be carried out by treating a starting material of the formula Ib with the necessary quantity, usually an excess of the oxidizing agent capable of furnishing an acyloxy group of the formula $-O-C(=O)-R_1$, usually in the presence of a suitable diluent, such as benzene, acetonitrile or acetic acid, if necessary, while cooling or warming and/or in an inert gas atmosphere, while irradiating with ultra-violet light.

The liberation of protected functional groups in an acyl residue can, for example, be carried out in the manner described above.

The compounds of the formula VI can be converted, by thermal decomposition, into compounds of the formula

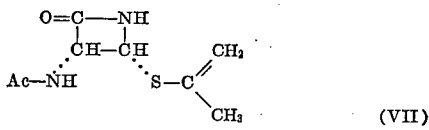

(VII)

in which, if desired, protected functional groups of an acyl residue can be liberated.

Compounds of the formula VII, especially those of the formula

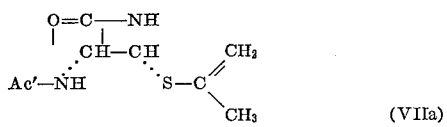
(VIIa)

possess valuable pharmacological properties; in particular they are active, in dilutions of down to 0.01%, against gram-positive bacteria, such as *Staphylococcus aureus* and are, therefore, useful as anti-bacterial substances. They primarily serve as intermediate products for the manufacture of valuable compounds, for example, pharmacologically active compounds or compounds suitable for use as intermediates.

The thermal decomposition of compounds of the formula VI is preferably performed in the presence of an inert solvent, especially a suitable hydrocarbon, such as an aliphatic or aromatic hydrocarbon, for example, high-boiling petroleum ether, benzene, toluene or xylene, at temperatures of about 50° C. to about 150° C., preferably from about 70° C. to about 120° C., if desired, in the atmosphere of an inert gas, such as nitrogen. Depending on the reaction conditions, the thermal decomposition may already take place during the manufacture of compounds of the formula VI, in which Ac represents an acyl group $Ac_0$.

In a resulting compound, suitable protected functional groups in an acylamino grouping may be liberated in the manner indicated above.

As has been mentioned, compounds of the formula VII can be used as intermediate products. Thus, they can, for example, be converted into compounds of formula

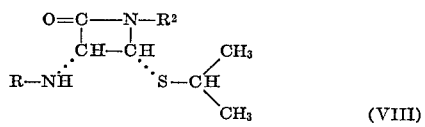
(VIII)

especially of formula

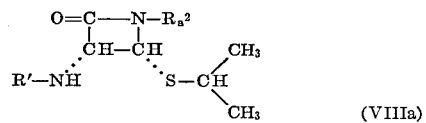
(VIIIa)

wherein $R^2$ represents a hydrogen atom or the acyl residue $Ac_2$ of an organic carboxylic acid, especially of one of the abovementioned optionally substituted aliphatic, cycloaliphatic, cycloaliphatic-aliphatic, aromatic, araliphatic, heterocyclic or heterocyclic-aliphatic carboxylic acids, as well as the acyl residue of a carbonic acid semi-derivative, and $R_a^2$ represents a hydrogen atom or the acyl residue $Ac_2'$ of a lower alkanecarboxylic acid, including formic acid.

Compounds of the above nature, especially those in which R and $R^2$ or R' and $R_a^2$ represent acyl groups, show valuable pharmacological properties; in particular, they are active against gram-positive bacteria such as *Staphylococcus aureus* in dilutions ranging to 0.01% and are, therefore, useful accordingly. They can also serve as intermediate products, such as for the manufacture of valuable compounds, for example, pharmacologically active compounds.

They can be obtained, when the isopropenyl group is saturated in compounds of formula VII and, if desired, in a resulting compound the formyl group is split off and/or, if desired, in a resulting compound the nitrogen atom of the lactam grouping carrying the hydrogen atom is acylated and/or, if desired, in a resulting compound an acylamino grouping is split and, if desired, the liberated amino group is acylated and/or, if desired, in a resulting compound having an acyl radical with protected functional groups these groups are liberated and/or, if desired, a resulting isomer mixture is resolved into the individual isomers.

The reduction of the isopropenyl radical in the starting material of formula VII is preferably performed by treatment with catalytically activated hydrogen, for example, with hydrogen in the presence of a noble metal catalyst which, for example, contains palladium or platinum, if necessary, at elevated pressure and/or with heating.

A formyl group $R_2$ can be replaced by hydrogen, for example, according to the method described above, while in a resutling compound it is possible, if desired, to split a suitable acylamino grouping in the manner mentioned above, and, if desired, to acylate a free amino group formed in this way; protected functional groups can be liberated, for example, as mentioned above.

Compounds of formula VII, primarily those in which Ac represents an acyl radical $Ac^0$ which is easily removable, especially under acid conditions, such as a suitable acyl radical of a carbonic acid half-ester, such as a carbo-lower alkoxy radical, which is optionally substituted in the lower alkyl portion, preferably in the α-position, as well as a carbo-lower alkenyloxy, carbo-cycloalkoxy, carbo-phenyloxy or carbo-phenyl-lower alkoxy radical which is optionally substituted in the lower alkenyl, cycloalkyl, phenyl and phenyl-lower alkyl portion, respectively, or a carbo-lower alkoxy radical having a heterocyclic group of aromatic character in the lower alkyl portion, preferably in the α-position, can furthermore be converted to compounds of the formula

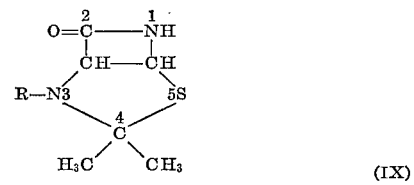
(IX)

especially to those compounds, in which R has the significance of R'; compounds of this type are known, for example, as valuable intermediate products in the synthetic manufacture of 7-acylamino-cephalosporanic acid compounds; see, for example, Austrian Pats. No. 263,768 and 264,537.

They are obtained, when compounds of formula VII, wherein Ac preferably represents one of the abovementioned easily removable radicals $Ac^0$, are treated with a strong oxygen-contaianing acid, and, if desired, in a resulting compound of formula IX having an unsubstituted nitrogen atom in the 3-position, the latter is acylated.

The ring closure can be effected by treatment with a strong inorganic or organic oxygen-containing acid, such as organic carboxylic or sulfonic acids, especially a strong lower alkanecarboxylic acid, which is optionally substituted by hetero-radicals, preferably by halogen atoms, such as an α-halogeno-acetic or α-halogenopropionic acid, wherein halogen preferably denotes fluorine, as well as chlorine, primarily trifluoroacetic acid. The reaction is carried out in the absence or presence of an inert solvent, such as dioxane, or of a mixture of diluents and, if necessary, with cooling, for example, at temperatures of about −30° to about +10° C., and/or in an inert gas, for example, nitrogen atmosphere.

Acylation of a hydrogen-containing nitrogen atom in a resulting compound can, for example, be carried out as described above, if desired, in stages.

Mixtures of isomers obtainable according to the above processes can be resolved into the individual isomers according to methods which are in themselves known, for example, by fractional crystallization, adsorption chromatography (column or thin layer chromatography) or other suitable resolution processes. Resulting racemates having salt-forming groups, into which, in view of the racemate resolution, suitable substituents can temporarily be introduced in the usual manner, can be resolved into the antipodes in the usual manner, for example, by forming a mixture of diastereo-isomeric salts with optically active salt-forming reagents, resolving the mixture into the diastereoisomeric salts and converting the separated salts into the free compounds, or by fractional crystallization from optionally active solvents.

The above processes also comprise those modifications according to which compounds formed as intermediates are used as starting materials and the remaining process stages are carried out with these or the process is interrupted at any stage; furthermore, starting materials can be used in the form of derivatives, for example, of salts, or can be formed during the reaction.

The invention also comprises new intermediate products, as well as processes for their manufacture.

Preferably, those starting materials are used and the reaction conditions are so chosen that the compounds mentioned above as being preferred are obtained.

The compounds of the present invention having pharmacological effect can, for example, be used in the form of pharmaceutical preparations in which they are in admixture with a solid or liquid pharmaceutical excipient and which are suitable for enteral or parenteral administration. Suitable excipients, which are inert towards the active substances, are, for example, water, gelatine, saccharides, such as lactose, glucose or sucrose, starches, such as corn starch, wheat starch or arrowroot, stearic acid or salts thereof, such as magnesium or calcium stearate, talc, vegetable fats and oils, alginic acid, benzyl alcohols, glycols or other known excipients. The preparations may be in solid form, or example, as tablets, dragees, capsules or suppositories, or in a liquid form, for example, as solutions, suspensions or emulsions. They can be sterilized and/or contain auxiliary substances such as preservatives, stabilizers, wetting agents or emulsifiers, solubilizing agents, salts for regulating the osmotic pressure and/or buffers. They can, furthermore, contain other pharmacologically usable substances. The pharmaceutical preparations, which are also comprised by the present invention, can be formulated in a manner which is in itself known.

The invention is described in the following Examples; temperatures are given in degrees centigrade.

EXAMPLE 1

A solution of 0.18 g. of 2-hydroxy-3,3-dimethyl-6-(N-phenyloxyacetyl-amino)-4-thia - 1 - azabicycli[3,2.0]heptan-7-one hydrate (configuration of 6-amino-penicillanic acid) in 5 ml. of tetrahydrofuran is mixed at 0° with 0.3 ml. of a solution of 0.38 g. of sodium borohyride in 5 ml. of water. The mixture is stirred for 20 minutes at 0°, then adjusted to pH ~4 by adding 12 drops of acetic acid and is diluted with 50 ml. of methylene chloride. The organic solution is twice washed with a saturated aqueous sodium chloride solution, the aqueous solutions are back-washed with methylene chloride and the combined organic solutions are dried and evaporated under reduced pressure. The crystalline residue is recrystallized from a mixture of methylene chloride and ether, whereupon the 2α-(2-hydroxymethyl-2-propyl-mercapto)-3α-(N-phenyloxyacetylamino)azetidin-4-one of the formula

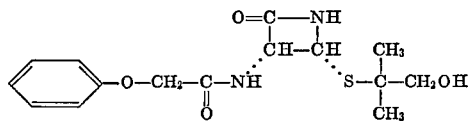

is obtained which after repeated recrystallization is obtained in needles, m.p. 156–157°; $[\alpha]_D^{20} = +130° \pm 1°$ (c.=0.708 in chloroform); infra-red absorption spectrum (in methylene chloride): characteristic bands at 3.03μ, 5.65μ, 5.94μ, 6.26μ, 6.58μ, 6.70μ, 8.15μ. 8.27μ and 9.43μ.

EXAMPLE 2

A solution of 0.3 g. of 2-hydroxy-3,3-dimethyl-6-(N-phenylacetyl-amino)-4-thia - 1 - azabicyclo[3.2.0]heptan-7-one (configuration of 6-amino-penicillanic acid) in 8 ml. of tetrahydrofuran is treated at 0° with 0.5 ml. of a solution of 0.38 g. of sodium borohydride in 5 ml. of water. The reaction mixture is stirred for 20 minutes at 0° and is then acidified with 20 drops of acetic acid and diluted with 50 ml. of methylene chloride. The organic solution is washed with a saturated aqueous sodium chloride solution, dried and evaporated. The residue, after crystallization from benzene, yields the 2α-(2-hydroxymethyl - 2 - propyl - mercapto) - 3α - (N - phenyl-acetyl-amino)-azetidin-4-one of the formula

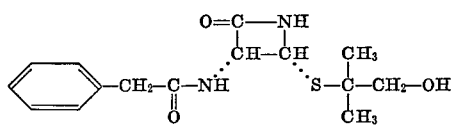

which melts at 120–133°; infra-red absorption spectrum (in methylene chloride): characteristic bands at 3.05μ, 3.15μ, 5.65μ, 6.00μ. 6.65μ, 7.45μ and 9.45μ.

EXAMPLE 3

A solution of 0.08 g. of 2-hydroxy-3,3-dimethyl-6-(N-carbo-tert.-butyloxy-amino)-4-thia - 1 - azabicyclo[3.2.0]heptan-7-one (configuration of 6-amino-penicillanic acid) in 5 ml. of tetrahydrofuran is mixed at 0° with 0.13 ml. of a solution of 0.38 g. of sodium borohydride in 5 ml. of water. The reaction mixture is stirred for 20 minutes at room temperature and is then acidified with 5 drops of acetic acid and diluted with methylene chloride. The organic phase is washed with a saturated aqueous sodium chloride solution, dried and evaporated under reduced pressure. The residue is chromatographed on 0.5 g. of acid-washed silica gel, apolar by-products being eluted with 5 ml. each of benzene and 9:1- and 4:1-mixtures of benzene and ethyl acetate, and the amorphous 2α-(2-hydroxymethyl - 2 - propylmercapto)-3α-(N-carbo-tert.-butyloxy-amino)-azetidin-4-one of the formula

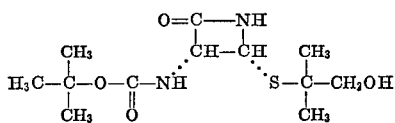

being eluted with 10 ml. of a 1:1-mixture of benzene and ethyl acetate and with 5 ml. of ethyl acetate; infra-red absorption spectrum (in methylene chloride): characteristic bands at 3.03μ, 5.63μ, 5.83μ, 6.63μ, 7.31μ, 8.60μ and 9.43μ.

EXAMPLE 4

A solution of 0.05 g. of 2α-(2-hydroxymethyl-2-propylmercapto) - 3α - (N - phenyloxyacetyl-amino)-azetidin-4-one in a mixture of 0.5 ml. of acetic acid anhydride and 0.1 ml. of pyridine is left to stand at room temperature for 1½ hours. The volatile portion is then distilled off under an oil pump vacuum; after adding a few ml. of toluene, the solvent is again distilled off. The 2α-(2-acetyloxy-methyl - 2 - propyl-mercapto)-3α-(N-phenyl-oxyacetyl-amino)azetidin-4-one of the formula

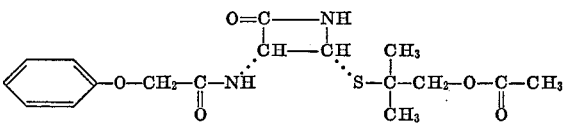

is obtained in crystalline form and is recrystallized from a mixture of methylene chloride and ether, m.p. 122°; $[\alpha]_D^{20} = -38° \pm 1°$ (c.=0.988 in chloroform); characteristic bands at 3.05μ, 5.64μ, 5.77μ, 5.93μ, 6.26μ, 6.58μ, 6.71μ, 7.27μ and 8.15μ.

EXAMPLE 5

A solution of 0.056 g. of 2α-(2-hydroxymethyl-2-propylmercapto) - 3α - (N-phenyloxyacetyl-amino)-azetidin-4-one in 1 ml. of tetrahydrofuran is treated with 0.2 ml. of a solution of 2 ml. of chloroformic acid ethyl ester diluted to a volume of 10 ml. with tetrahydrofuran, and with 0.1 ml. of pyridine, the mixture being stirred at room temperature. A gum-like precipitate immediately forms and solidifies during the course of the reaction. After 4 hours, the mixture is diluted with methylene chloride, washed with water, dried and evaporated under reduced pressure. The 2α-(2 - ethyloxy-carbonyloxymethyl-2-propylmercapto)-3α - (N-phenyloxyacetyl-amino)-azetidin-4-one of the formula

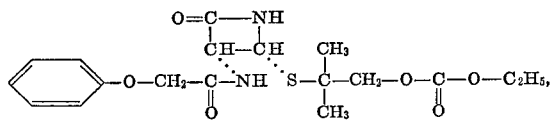

is thus obtained, which after recrystallization from a mixture of methylene chloride and ether melts at 103–105°; $[\alpha]_D^{20} = +11° \pm 1°$ (c.=1.133 in chloroform); infra-red absorption spectrum (in methylene chloride): characteristic bands at 3.05μ, 5.63μ, 5.75μ, 5.94μ, 6.27μ, 6.60μ, 6.72μ, 8.18μ and 9.88μ.

EXAMPLE 6

A solution of 0.4 g. of 2α-(2-hydroxymethyl-2-propylmercapto) - 3α - (N-phenyloxyacetyl-amino)-azetidin-4-one and 0.52 g. of 2,2,2-trichloroethoxy-carbonyl chloride in 6 ml. of dry tetrahydrofuran is slowly mixed at 0°, while stirring, with a solution of 0.6 ml. of pyridine in 4 ml. of dry tetrahydrofuran. After completion of the addition, the mixture is stirred for 3 hours and then diluted with 100 ml. of methylene chloride; the organic solution is washed with water, dried and evaporated. The residue is chromatographed on 40 g. of acid-washed silica gel. By-products, mainly bis-2,2,2-trichloroethyl carbonate, are eluted with benzene, as well as 9:1-and 4:1-mixtures of benzene and ethyl acetate. The 2α-[2-(2,2,2-trichloroethoxy-carbonyloxy-methyl)-2 - propylmercapto]-3α-(N-phenyloxyacetyl-amino)-azetidin-4-one of the formula

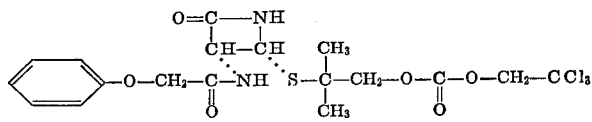

is eluted with a 1:1-mixture of benzene and ethyl acetate and recrystallized from a mixture of ether and pentane, m.p. 93–95°; $[\alpha]_D^{20} = -6° \pm 1°$ (c.=1.17 in chloroform); infra-red absorption spectrum (in methylene chloride): characteristic bands at 3.03μ, 5.63μ, 5.68μ, 5.92μ, 6.26μ, 6.69μ, 6.70μ, 7.25μ and 8.08μ.

The compounds used in the above Examples as starting materials may be prepared, for example, as follows:

EXAMPLE 7

A solution of 2.625 g. of penicillin-V in 30 ml. of tetrahydrofuran is mixed with 5.31 ml. of a 10 ml.-solution of 2 ml. of triethylamine in tetrahydrofuran while stirring and cooling to −10°. 3.6 ml. of a 10 ml.-solution of 2 ml. of chloroformic acid ethyl ester in tetrahydrofuran are then added slowly at −10° and after completion of the addition, the mixture is stirred for 90 minutes at −10° to −5°.

The reaction mixture is treated with a solution of 0.51 g. of sodium azide in 5.1 ml. of water, stirred for 30 minutes at 0° to −5° and diluted with 150 ml. of ice water. It is extracted three times with methylene chloride; the organic extracts are washed with water, dried and evaporated at 25° and under reduced pressure. The amorphous penicillin-V azide is thus obtained as a slightly yellowish oil; infra-red absorption spectrum (in methylene chloride): characteristic bands at 3.04μ, 4.70μ, 5.61μ, 5.82μ (shoulder), 5.93μ, 6.26μ, 6.61μ, 6.71μ, 8.50μ and 9.40μ.

A solution of 2.468 g. of penicillin-V azide in 30 ml. of benzene is heated to 70° for 30 minutes. The pure 2-isocyanato-3,3-dimethyl - 6 - (N-phenyloxyacetyl-amino)-4-thia-1-azabicyclo[3.2.0]heptan-7-one (configuration of 6-amino-penicillanic acid) can be obtained by evaporating the solution under reduced pressure; infra-red absorption spectrum (in methylene chloride): characteristic bands at 3.03μ, 4.46μ, 5.59μ, 5.93μ, 6.26μ, 6.62μ, 6.70μ, 7.53μ, 8.28μ, 8.53μ, 9.24μ and 9.40μ.

The above solution of the 2-isocyanato-3,3-dimethyl-6-(N-phenyloxyacetyl-amino) - 4 - thia-1-azabicyclo[3.2.0] heptan-7-one is mixed with 3.4 ml. of a 10 ml.-solution of 2 ml. of 2,2,2-trichloroethanol in benzene and the reaction mixture is kept for 95 minutes at 70°. The solvent is removed under reduced pressure and the residue is purified on 40 ml. of acid-washed silica gel (column). Using 300 ml. of benzene and 300 ml. of a 9:1-mixture of benzene and ethyl acetate, by-products are washed out and the pure 2-(N-carbo - 2,2,2 - trichloroethoxy-amino)-3,3-dimethyl-6-(N-phenyloxyacetyl-amino) - 4 - thia-1-azabicyclo[3.2.0]heptan-7-one (configuration of 6-amino-penicillanic acid) of the formula

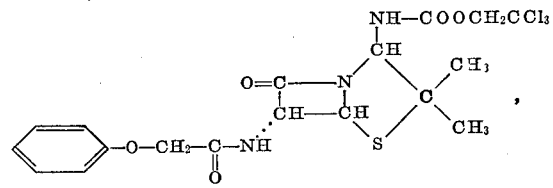

is eluted with 960 ml. of a 9:1-mixture of benzene and ethyl acetate. After recrystallization from a mixture of ether and pentane, the product melts at 169–171° (decomposition); $[\alpha]_D^{20} = +83°$ (c.=1.015 in chloroform); thin layer chromatogram (silica gel): $R_f = 0.5$ in a 1:1-mixture of benzene and ethyl acetate; infra-red absorption spectrum (in methylene chloride): characteristic bands at 3.05μ, 5.62μ, 5.77μ, 5.93μ, 6,27μ, 6.62μ, 6.70μ, 8.30μ, 9.23μ and 9.50μ.

Instead of the abovementioned 2 - (N-carbo-2,2,2-trichloroethoxy-amino) - 3,3 - dimethyl-6-(N-phenyloxyacetyl-amino)-4-thia - 1 - azabicyclo[3.2.0]heptan-7-one it is also possible to use as an intermediate, the corresponding 2-(N-carbo - 2,2 - dichloroethoxyamino)-3,3-dimethyl-6-(N-phenyloxyacetyl-amino)-4-thia - 1 - azabicyclo[3.2.0] heptan-7-one (configuration of 6-amino-penicillanic acid) of the formula

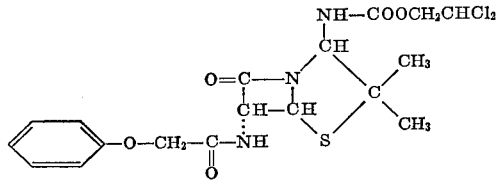

which after recrystallization from methylene chloride and ether melts at 145–147°; $[\alpha]_D^{20} = +89° \pm 1°$ (c.=0.963 in chloroform); infra-red absorption spectrum (in methylene chloride): characteristic bands at 3.03μ, 5.60μ, 5.78μ, 5.93μ, 6.27μ, 6.60μ, 6.72μ, 8.28μ and 9.51μ.

EXAMPLE 8

15 ml. of a sulfonic acid type of ion exchanger (H⊕-form) are converted to the triethylammonium salt form by treatment with a solution of 5 ml. of triethylamine in 100 ml. of water, the column is washed with 300 ml. of water until neutral and treated with a solution of 2 g. of the sodium salt of penicillin-G in 10 ml. of water, and thereafter eluted with water. A total of 45 ml. is taken and the solution is lyophilized at a pressure of 0.01 mm. Hg. The crude triethylammonium salt of penicillin-G thus obtained is dissolved in methylene chloride and the solution is dried over sodium sulfate, filtered and evaporated.

A solution of the penicillin-G triethylammonium salt obtainable in this manner, in a mixture of 40 ml. of methylene chloride and 40 ml. of tetrahydrofuran, is cooled to —10° and slowly mixed with 2.9 ml. of a 10 ml.-solution of 2 ml. of chloroformic acid ethyl ester in tetrahydrofuran while stirring. The mixture is stirred for 90 minutes at —5° to 0°, then mixed with a solution of 0.395 g. of sodium azide in 4 ml. of water, and the mixture is stirred for 30 minutes at —5° to 0°. It is diluted with 100 ml. of ice water and extracted three times with 75 ml. of methylene chloride at a time; the organic extracts are washed with water, dried and evaporated at room temperature under reduced pressure. The amorphous penicillin-G azide is thus obtained, infra-red absorption spectrum (in methylene chloride): characteristic bands at $3.05\mu$, $4.71\mu$, $5.62\mu$, $5.80\mu$, $5.94\mu$, $6.69\mu$ and $8.50\mu$.

A solution of 1.72 g. of the penicillin-G azide in 30 ml. of benzene is mixed with 1.5 ml. of 2,2,2-trichloroethanol and stirred for 25 hours at 70°. During the first 15 minutes a continuous evolution of nitrogen is observed and after a few hours the product separates out from the solution. The mixture is diluted with 60 ml. of hexane while stirring, cooled, and filtered after 15 minutes. The filter residue is washed with a 2:1-mixture of benzene and hexane and with cold ether. The pure 2-(N-carbo-2,2,2-trichloroethoxy-amino)-3,3-dimethyl-6-(N - phenylacetyl-amino)-4-thia-1-azabicyclo[3.2.0]heptan-7-one (configuration of 6-amino-penicillanic acid) of the formula

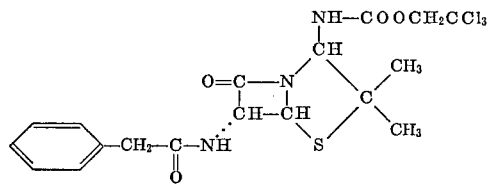

m.p. 223–223.5°, is thus obtained; $[\alpha]_D^{20} = +172°$ (c.=1.018 in ethanol); infra-red absorption spectrum (in methylene chloride): characteristic bands at $3.04\mu$, $5.61\mu$, $5.77\mu$, $6.57\mu$, $6.70\mu$, $8.30\mu$, $9.17\mu$, $9.62\mu$ and $11.85\mu$.

The product can also be obtained by warming 0.03 g. of penicillin-G azide in 2 ml. of benzene to 70° for 20 minutes, and forming the 2-isocyanato-3,3-dimethyl-6-(N-phenylacetyl-amino)-4-thia-1-azabicyclo[3.2.0]heptan - 7-one (configuration of 6-amino-penicillanic acid) by evaporating the reaction mixture under reduced pressure; infra-red absorption spectrum (in methylene chloride): characteristic bands at $3.06\mu$, $4.48\mu$, $5.62\mu$, $5.96\mu$ and $6.70\mu$; and converting this, in accordance with the process indicated in Example 7, by reaction with 2,2,2-trichloroethanol into the desired 2-(N-carbo-2,2,2-trichloroethoxy-amino)-3,3-dimethyl-6-(N-phenylacetyl-amino)-4 - thia-1-azabicyclo[3.2.0]heptan-7-one (configuration of 6-amino-penicillanic acid).

EXAMPLE 9

A suspension of 0.5 g. of crude 6-amino-penicillanic acid in 4 ml. of chloroform (freshly distilled over phosphorus pentoxide) is treated with 1 ml. of hexamethyldisilazane of the formula $[(CH_3)_3Si]_2NH$ and 1 ml. of chloroform (dried over phosphorus pentoxide); the reaction mixture is boiled under reflux for 2½ hours with exclusion of atmospheric moisture, is then cooled to 0°, and, after the addition of 1.7 ml. of 10 ml.-solution of 2 ml. of triethylamine in chloroform, is treated with 0.385 g. of distilled fluoroformic acid tert.-butyl ester. The mixture is kept for 30 minutes at 0° and then for 90 minutes at room temperature and is diluted with cold methylene chloride. The organic solution is washed with a cold 10% aqueous citric acid solution and water, with the aqueous wash solutions being back-washed with cold methylene chloride. The combined organic extracts are twice extracted with a dilute aqueous sodium hydrogen carbonate solution and, immediately after separation, are acidified with citric acid in the presence of methylene chloride and at 0°. The organic phase is separated, dried and evaporated; the pure amorphous 6-(N-carbo-tert.-butyloxy-amino)-penicillanic acid is thus obtained; infra-red absorption spectrum (in methylene chloride): characteristic bands at $3.04\mu$, $5.63\mu$, $5.82\mu$, $6.67\mu$, $7.32\mu$, and $8.60\mu$; and is immediately used without purification.

The resulting 6-(N-carbo-tert.-butyloxy-amino)-penicillanic acid is dissolved in 10 ml. of methylene chloride and treated with 0.43 ml. of a 10 ml.-solution of 2 ml. of triethylamine in methylene chloride. On evaporation the 6-(N-carbo-tert.-butyloxy-amino)-penicillanic acid triethylammonium salt is obtained as an amorphous residue; infra-red absorption spectrum (in methylene chloride): characteristic bands at $3.05\mu$, $5.67\mu$, $5.85\mu$, $6.17\mu$, $6.67\mu$, $7.32\mu$ and $8.53\mu$.

A solution of 0.226 g. of the 6-(N-carbo-tert.-butyloxy-amino)-penicillanic acid triethylammonium salt in 5 ml. of tetrahydrofuran is mixed at —10° with 0.26 ml. of a 10 ml.-solution of 2 ml. of chloroformic acid ethyl ester in tetrahydrofuran. After stirring for 90 minutes at —5° to —10°, the mixture is treated with a solution of 0.04 g. of sodium azide in 0.4 ml. of water. The mixture is stirred for a further 30 minutes at —5° to 0° and is then diluted with 20 ml. of ice-water and extracted with methylene chloride. The organic extract is dried and evaporated under reduced pressure at a temperature below 25°; the crude 6-(N-carbo-tert.-butyloxy-amino)-penicillanic acid azide is obtained as the residue; infra-red absorption spectrum (in methylene chloride): characteristic bands at $3.03\mu$, $4.70\mu$, $5.62\mu$, $5.83\mu$, $6.16\mu$, $7.32\mu$, $8.60\mu$ and $9.40\mu$.

The crude product obtained above is dissolved in 5 ml. of benzene, stirred for 5 minutes at 70°, and a small amount of the solvent is evaporated; according to the infra-red spectrum (in methylene chloride: characteristic bands at $3.03\mu$, $4.48\mu$, $5.61\mu$, $5.83\mu$, $6.67\mu$, $7.31\mu$, $7.55\mu$ and $8.62\mu$), the rearrangement to give the 2-isocyanato-3,3-dimethyl-6-(N-carbo-tert.-butyloxy-amino)-4 - thia-1-azabicyclo[3.2.0]heptan-7-one (configuration of 6-amino-penicillanic acid) is complete. The warm benzene solution is mixed with 0.3 ml. of 2,2,2-trichloroethanol; the reaction mixture is stirred for a further 90 minutes at 70° and is then evaporated under reduced pressure. The 2-(N-carbo - 2,2,2 - trichloroethoxy-amino)-3,3-dimethyl-6-(N-carbo-tert.-butyloxy-amino)-4-thia-1 - azabicyclo[3.2.0] heptan-7-one (configuration of 6-amino-penicillanic acid) of the formula

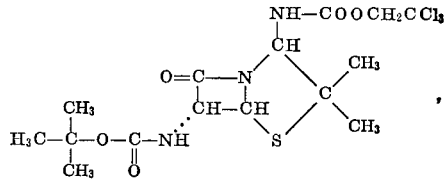

is thus obtained as a crystalline product which after re-crystallization from a mixture of ether and pentane melts at 165–167°; infra-red absorption spectrum (in methylene chloride): characteristic bands at $3.04\mu$, $5.63\mu$, $5.81\mu$, $5.84\mu$, $6.69\mu$, $7.34\mu$, $8.65\mu$, $9.16\mu$ and $9.59\mu$.

EXAMPLE 10

A solution of 3 g. of crystalline 2-(N-carbo-2,2,2-trichloroethoxy-amino) - 3,3-dimethyl - 6 - (N-phenyloxy-acetyl-amino)-4-thia-1-azabicyclo[3.2.0]heptan-7-one in 65 ml. of 90% aqueous acetic acid and 30 ml. of dimethylformamide is mixed with 32.6 g. of zinc dust over the course of 20 minutes while cooling with ice, and is stirred for 20 minutes. The excess zinc is filtered off and the filter residue is washed with benzene; the filtrate is diluted with 450 ml. of benzene, washed with a saturated aqueous sodium chloride solution and with water, dried and evaporated under reduced pressure. The residue is purified on a column of 45 g. of acid-washed silica gel. Elution is carried out with 100 ml. of benzene and 400 ml. of a 9:1-mixture of benzene and ethyl acetate and apolar products are obtained. Starting material is eluted with 100 ml. of a 4:1-mixture of benzene and ethyl acetate, and with a further 500 ml. of the 4:1-mixture of benzene and ethyl acetate and with 200 ml. of a 2:1-mixture of benzene and ethyl acetate 2-hydroxy-3,3-dimethyl-6-(N-phenyloxy-acetyl-amino) - 4-thia-1-azabicyclo[3.2.0]heptan-7-one (configuration of 6-amino-penicillanic acid) of the formula

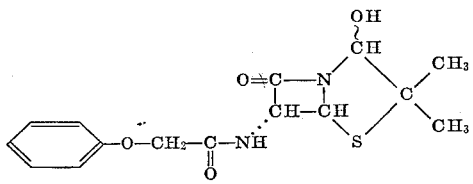

is obtained; this crystallizes spontaneously as the hydrate and after trituration with ether, saturated with water, melts in an unsharp manner in the range of 62–85° C.

If chromatographed but non-crystalline starting material is used and the reduction is carried out in dilute acetic acid without the addition of dimethylformamide, the pure product, m.p. 62–70°, is obtained; thin layer chromatogram (silica gel): $R_f = 0.35$ in a 1:1-mixture of benzene and ethyl acetate; infra-red absorption spectrum (in methylene chloride): characteristic bands at $2.93\mu$, $3.09\mu$, $5.65\mu$, $5.96\mu$, $6.29\mu$, $6.65\mu$, $6.75\mu$, $8.57\mu$, $9.27\mu$, $10.00\mu$ and $11.95\mu$.

EXAMPLE 11

A solution of 2.49 g. of 2-(N-carbo-2,2,2-trichloroethoxy-amino)-3,3-dimethyl-6-(N - phenylacetyl-amino)-4-thia-1-azabicyclo[3.2.0]heptan-7-one in 50 ml. of dimethylformamide, 25 ml. of acetic acid and 5 ml. of water is prepared at room temperature, and is then cooled to 0° and mixed with a total of 25 g. of zinc dust over the course of 10 minutes while stirring. The mixture is left for 20 minutes at 0°, and is then filtered into a receiver containing 500 ml. of a saturated aqueous sodium chloride solution, and the filter residue is washed with 25 ml. of acetic acid. The filtrate is extracted three times with 300 ml. of benzene at a time; the organic extracts are washed with water, a dilute aqueous sodium hydrogen carbonate solution and water, combined, dried and evaporated under reduced pressure. The residue is chromatographed on 45 g. of acid-washed silica gel. Fractions of 100 ml. each are taken, elution being carried out with 300 ml. of benzene, 300 ml. of a 9:1-, 500 ml. of a 4:1-, 600 ml. of a 2:1- and 200 ml. of a 1:1-mixture of benzene and ethyl acetate and 100 ml. of ethyl acetate. Fractions 8 and 9 contain crystalline starting material, while the 2-hydroxy-3,3-dimethyl - 6 - (N-phenylacetyl-amino)-4-thia-1-azabicyclo [3.2.0]heptan-7-one (configuration of 6 - amino-penicillanic acid) of the formula

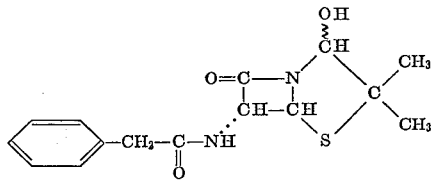

is obtained as a colorless oil from fractions 11–15; infrared absorption spectrum (in methylene chloride): characteristic bands at $2.90\mu$, $3.05\mu$, $5.64\mu$, $5.99\mu$, $6.70\mu$ and $9.28\mu$.

EXAMPLE 12

A solution of 0.5 g. of 2 - (N-carbo-2,2,2-trichloroethoxy-amino) - 3,3 - dimethyl-6-(N-carbo-tert.-butyloxy-amino)-4-thia-1-azabicyclo[3.2.0]heptan-7 - one (configuration of 6-amino-penicillanic acid) in 5 ml. of tert.-butanol is diluted with 4 ml. of acetic acid and 1 ml. of water. After cooling in an ice bath, 5 g. of zinc dust are added in small portions over the course of 15 minutes while stirring. The mixture is stirred for a further 30 minutes at 0° and is then filtered into a receiver containing 70 ml. of a saturated aqueous sodium chloride solution. The residue is washed with methylene chloride and the aqueous phase of the filtrate is extracted with the same solvent. The organic extracts are washed with a saturated sodium chloride solution, dried and evaporated under reduced pressure. The crude product thus obtained can be purified by chromatography on 10 g. of acid-washed silica gel a forerun being taken with a 9:1-mixture of benzene and ethyl acetate, and the 2-hydroxy-3,3-dimethyl-6-(N-carbo-tert.-butyloxy-amino) - 4 - thia-1-azabicyclo[3.2.0] heptan-7-one (configuration of 6-amino-penicillanic acid) of the formula

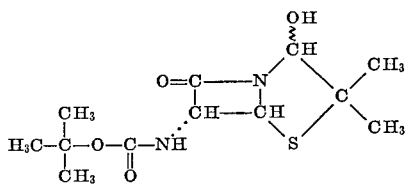

being then eluted as a colorless oil with the same solvent mixture and with a 4:1-mixture of benzene and ethyl acetate. This material crystallizes from a mixture of ether and pentane, m.p. 106–110° (sintering from 100° up); $[\alpha]_D^{20} = 115° \pm 1°$ (c.=0.858 in chloroform); thin layer chromatogram (silica gel); $R_f \sim 0.53$ in a 1:1-mixture of benzene and ethyl acetate; infra-red absorption spectrum (in methylene chloride): characteristic bands at $2.91\mu$, $3.04\mu$, $5.64\mu$, $5.84\mu$, $6.68\mu$, $7.33\mu$ and $8.60\mu$.

The compounds of this invention may be used in the following manner:

EXAMPLE 13

A solution of 0.02 g. of 2α-(2-hydroxymethyl-2-propylmercapto)-3α-(N-phenyloxyacetyl-amino) - azetidin - 4-one in a mixture of 0.2 ml. of acetic acid anhydride and 0.05 ml. of pyridine is heated for 5½ hours at 70° under anhydrous conditions. The solvents are evaporated at a pressure of 1 m. Hg; the residue is dissolved in toluene and the solvent is again evaporated off under reduced pressure. The 1-acetyl-2α-(2 - acetyloxymethyl-2-propylmercapto) - 3α - (N-phenyloxyacetyl-amino)-azetidin-4-one of the formula

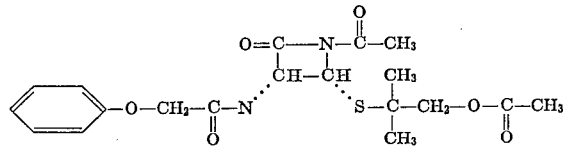

is obtained as a colorless amorphous residue; $R_f = 0.55$ (silica gel plates; ethyl acetate); infra-red absorption spectrum (in methylene chloride): characteristic bands at $3.05\mu$, $5.58\mu$, $5.77\mu$, $5.85\mu$, $5.92\mu$, $6.27\mu$, $6.62\mu$, $6.72\mu$, and $7.29\mu$.

EXAMPLE 14

A suspension of 0.08 g. of 2α-(2-hydroxymethyl-2-propyl-mercapto)-3α-(N-phenyloxyacetyl-amino) - azetidin - 4-one in 25 ml. of anhydrous benzene is treated with 0.3 g. of lead tetraacetate containing 10% of acetic acid and irradiated at about 10° with a high pressure mercury vapor lamp (80 watts) in a water-cooled Pyrex glass jacket, while stirring. After 45 minutes, no further tetravalent lead compound can be detected with potassium iodide-starch paper. The precipitate forming on the walls of the vessel during the reaction is scraped off from time to time. 1 g. of "polystyrene-Hünig base" (manufactured by warming a mixture of 100 g. of chloromethylpolystyrene [J. Am. Chem. Soc. 85, 2149 (1963)] 500 ml. of benzene, 200 ml. of methanol and 100 ml. of diisopropylamine to 150° while shaking, filtering, washing with 1000 ml. of methanol, 1000 ml. of a 3:1-mixture of dioxane and triethylamine, 1000 ml. of methanol, 1000 ml. of dioxane and 1000 ml. of methanol, and drying for 16 hours at 100°/100 mm. Hg; the product neutralizes 1.55 milliequivalents of hydrochloric acid per 1 g. in a 2:1-mixture of dioxane and water) is added to the mixture, which is stirred for 5 minutes and filtered, and the filtrate is evaporated at about 30–40° under reduced pressure. The residue contains the 2α - (2-acetyloxy-2-propylmercapto)-3α-(N-phenyloxyacetyl-amino) - azetidin-4-one of the formula

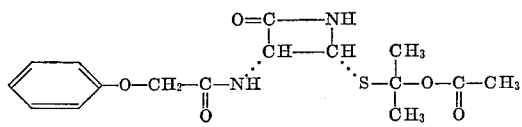

which is processed without additional purification.

The 2α - (2-hydroxymethyl-2-propylmercapto) - 3α-(N-carbo-tert.-butyloxy-amino) - azetidin - 4 - one can be converted to the 2α-(2-acetyloxy-2-propylmercapto)-3α-(N-carbo-tert.-butyloxy-amino)-azetidin - 4 - one in a similar manner by treatment with lead tetraacetate.

EXAMPLE 15

Half of the crude product, obtainable according to the process of Example 14, containing 2α-(2-acetyloxy-2-propyl-mercapto) - 3α - (N-phenyloxyacetyl-amino) - azetidin-4-one, is dissolved in 5 ml. of anhydrous dioxane and the solution is kept for 17 hours at 100° and then evaporated under reduced pressure. The crude product is chromatographed on 1 g. of acid-washed silica gel. Apolar by-products are eluted with 10 ml. of benzene and 20 ml. of a 9:1-mixture of benzene and ethyl acetate, and the crystalline 2α - isopropenylmercapto-3α-(N-phenyloxyacetyl-amino)-azetidin - 4 - one of the formula

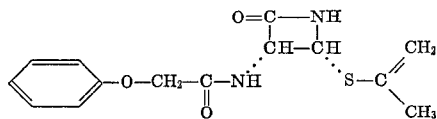

is eluted with 30 ml. of a 4:1-mixture of benzene and ethyl acetate; m.p. 156–158°; $[\alpha]_D^{20} = -70° \pm 2°$ (c.=0.665 in chloroform); infra-red absorption spectrum (in methylene chloride); characteristic bands at 307μ, 5.65μ, 5.96μ, 6.29μ, 6.59μ, 6.74μ, 8.19γ, 9.25μ and 9.92μ.

Upon heating 2α - (2-acetyloxy-2-propylmercapto)-3α-(N-carbo-tert.-butyloxy-amino) - azetidin-4-one, the 2α-isopropenylmercapto - 3α - (N-carbo-tert.-butyloxy-amino)-azetidin-4-one of the formula

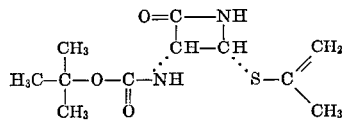

is obtained, which after crystallization from cold ether melts at 141° and after sublimation (128–132°/0.001 mm. Hg) at 142–144°; $[\alpha]_D^{20} = -26° \pm 1°$ (c.=0.883 in chloroform); ultraviolen absorption spectrum (in ethanol): $\lambda_{max} = 223$ mμ (ε=4840); infra-red absorption spectrum (in methylene chloride): characteristic bands at 3.03μ, 5.63μ, 5.84μ, 6.22μ, 6.67μ, 7.32μ, 7.57μ, 8.64μ, 9.45μ and 11.65μ.

EXAMPLE 16

A solution of 0.08 g. of 2α-isopropenylmercapto-3α-(N-phenyloxyacetyl-amino)-azetidin-4-one in 10 ml. of ethyl acetate is stirred for 45 minutes in the presence of 0.1 g. of a 10% palladium-on-charcoal catalyst, in a hydrogen atmosphere; the absorption of the hydrogen ceases after about 25 minutes. The reaction mixture is filtered and the filtrate is evaporated. The crystalline residue is recrystallized from a mixture of methylene chloride and ether; the resulting 2α-isopropylmercapto-3α-(N-phenyloxyacetyl-amino)-azetidin-4-one of the formula

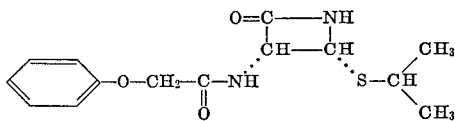

melts at 128–130° and 143° (double melting point); infra-red absorption spectrum (in methylene chloride): characteristic bands at 3.05μ, 5.63μ, 5.93μ, 6.26μ, 6.58μ, 6.70μ, 8.15μ, 9.21μ and 9.41μ.

EXAMPLE 17

A solution of 2α-isopropenylmercapto-3α-(N-carbo-tert.-butyloxy-amino)-azetidin-4-one in 0.5 ml. of cold trifluoroacetic acid is kept for 15 minutes at 0°; the solution turns slightly yellowish and is then diluted with a solution of 1 g. of crystalline sodium acetate in 2 ml. of water. The mixture is extracted three times with 10 ml. of methylene chloride at a time; the combined organic extracts are dried and evaporated under reduced pressure; the acetic acid is removed at 0.001 mm. Hg. The 4,4-dimethyl-azetidino[3.2.0-d]thiazolidin-2-one of the formula

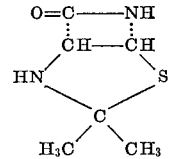

is obtained as a colorless oil which crystallizes on addition of benzene and melts at 115–117° after recrystallization from benzene; $[\alpha]_D^{20} = +8° \pm 1°$ (c.=0.845 in chloroform); thin layer chromatography (silica gel; system: 1:1-mixture of benzene and ethyl acetate): $R_f = 0.13$; infrared absorption spectrum (in methylene chloride): characteristic bands at 2.95μ, 5.68μ (potassium bromide) and 5.78μ.

EXAMPLE 18

A solution of 0.15 g. of 4,4-dimethyl-azetidino[3.2-d] thiazolidin-2-one in 10 ml. of dry tetrahydrofuran (freshly filtered through a column of aluminum oxide, activity I) is cooled to 0°. Phosgene is passed through the cold solution for 5 minutes and the reaction mixture is stirred for a further 30 minutes and with the exclusion of atmospheric moisture; the precipitate which initially appears re-dissolves. The mixture is then evaporated and the residue is chromatographed on 3 g. of acid-washed silica gel. The desired 3-chlorocarbonyl-4,4-dimethyl - azetidino[3.2-d] thiazolidin-2-one of the formula

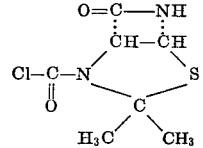

is eluted with benzene and with a 9:1-mixture of benzene and ethyl acetate and crystallizes spontaneously. It is recrystallized from a mixture of benzene and hexane and melts at 178–180° (transformation at 140–160°); infrared absorption spectrum (in methylene chloride): characteristic bands at 3.04μ, 5.62μ, 5.74μ, 7.48μ, 8.28μ and 11.84μ.

A solution of 0.1 g. of 3-chlorocarbonyl-4,4-dimethyl-azetidino[3.2-d]thiazolidin-2-one in 10 ml. of tert.-butanol is mixed with 0.2 g. of calcium carbonate and heated in a closed vessel for 2½ days at 90° bath temperature while stirring. After cooling the mixture is filtered, the residue is washed with benzene and the filtrate is evaporated under reduced pressure. The residue is taken up in benzene; the organic solution is washed with water, dried and again evaporated. The residue is again dissolved in benzene and chromatographed on 1 g. of acid-washed silica gel. The 3-carbo-tert.-butyloxy-4,4-dimethyl-azetidino[3.2-d]thiazolidin-2-one of the formula

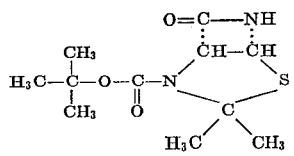

is eluted with 9:1- and 4:1-mixtures of benzene and ethyl acetate and recrystallized from a mixture of ether and pentane, melting point 117–120° (analytical preparation: 120.5°); $[\alpha]_D^{20} = -274°$ (c.=0.522 in chloroform); thin layer chromatogram (silica gel; system: 1:1-mixture of benzene and ethyl acetate): $R_f = 0.15$; infra-red absorption spectrum (in methylene chloride): characteristic bands at $2.95\mu$, $5.62\mu$, $5.90\mu$, $7.25\mu$, $7.35\mu$, $7.75\mu$, $8.65\mu$, $9.36\mu$, $10.60\mu$, $11.65\mu$ and $12.30\mu$.

We claim:
1. A compound of the formula

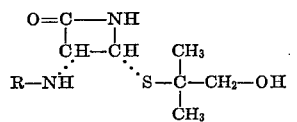

in which R is a member selected from the group consisting of a hydrogen atom, phenylacetyl, phenyloxyacetyl and lower alkoxycarbonyl, and O-esters of such a compound, in which the esterifying group is a member selected from the group consisting of lower alkanoyl, lower alkoxycarbonyl and 2-halogeno-loweralkoxy-carbonyl.

2. A compound as claimed in claim 1 and being 2α-(2-hydroxymethyl-2-propylmercapto) - 3α - (N-phenyloxyacetyl-amino)-azetidine-4-one.

3. A compound as claimed in claim 1 and being 2α-(2-hydroxymethyl - 2 - propylmercapto)-3α-(N-phenylacetylamino)-azetidine-4-one.

4. A compound as claimed in claim 1 and being 2α-(2-hydroxymethyl - 2 - propylmercapto)-3α-(N-carbo-tert.-butyloxyamino)-azetidine-4-one.

5. A compound as claimed in claim 1 and being 2α-(2-acetyloxymethyl - 2 - propylmercapto)-3α-(N-phenyloxyacetylamino)-azetidine-4-one.

6. A compound as claimed in claim 1 and being 2α-(2-ethoxycarbonyloxymethyl - 2 - propylmercapto)-3α-(N-phenyloxyacetylamino)-azetidine-4-one.

7. A compound as claimed in claim 1 and being 2α-[2-(2,2,2-trichloroethoxycarbonyloxymethyl) - 2 - propylmercapto]-3α-(N-phenyloxyacetylamino)-azetidine-4-one.

References Cited
UNITED STATES PATENTS

| | | | |
|---|---|---|---|
| 3,487,071 | 12/1969 | Sheehan | 260—239 A |
| 3,487,072 | 12/1969 | Sheehan | 260—239 A |
| 3,487,090 | 12/1969 | Sheehan | 260—239 A |

ALTON D. ROLLINS, Primary Examiner

U.S. Cl. X.R.

260—240 D, 240 K, 243 C, 256.5 R, 287 R, 295 D, 295.5 A, 302 H, 306.7, 307 R, 307 H, 347.2; 424—244